INVENTORS
JOHN D. ALLEN
RAY G. HOLT
BY
William J. Flynn
ATTORNEY

Oct. 18, 1966   J. D. ALLEN ET AL   3,279,558
FLOW DIVIDER AND FLOW-DIVIDING HYDRAULIC SYSTEM
Filed Sept. 17, 1962                                     3 Sheets-Sheet 2

INVENTORS
JOHN D. ALLEN
BY RAY G. HOLT

William J. Flynn
ATTORNEY

Oct. 18, 1966  J. D. ALLEN ET AL  3,279,558
FLOW DIVIDER AND FLOW-DIVIDING HYDRAULIC SYSTEM
Filed Sept. 17, 1962  3 Sheets-Sheet 3

INVENTORS
JOHN D. ALLEN
RAY G. HOLT
BY
William J. Flynn
ATTORNEY

United States Patent Office 3,279,558
Patented Oct. 18, 1966

3,279,558
FLOW DIVIDER AND FLOW-DIVIDING
HYDRAULIC SYSTEM
John D. Allen, South Euclid, and Ray G. Holt, Westlake, Ohio, assignors to Fawick Corporation, a corporation of Michigan
Filed Sept. 17, 1962, Ser. No. 223,948
11 Claims. (Cl. 180—79.2)

This invention relates to a flow divider and to a flow-dividing hydraulic system.

On bulldozers, tractors and other heavy automotive equipment having power steering, it has been common practice to provide a flow divider for controlling the flow of hydraulic fluid to the power steering unit and to another fluid-operated load device on the vehicle, such as the blade on a bulldozer. Where the steering pressure is normally low, or where high steering pressure is required only intermittently, a system having a flow divider and only a single pump is satisfactory. However, a single pump system is not satisfactory where relatively high steering pressures are required almost continually. When the blade or other load device is not in operation, the full output from the pump is delivered at the pressure existing in the power steering circuit. Since the power steering unit does not require the full output of the pump, a large part of the hydraulic fluid being pumped is recirculated at high pressure without performing any effective work. The hydraulic system tends to become overheated and a substantial fraction of the engine power required to operate the pump is wasted.

To avoid these disadvantages, various systems have been adopted heretofore in which two separate pumps are provided, one for the power steering circuit only and the other for the hydraulic circuit of the blade or other load device. Because of the necessity to steer the vehicle at low engine speeds, such systems required a steering pump large enough to deliver at low speed an adequate flow to the power steering unit for minimum acceptable steering speed. At higher engine speeds, however, such a large capacity pump delivers an output far in excess of the requirements of the power steering unit, thus producing excessive back pressure and heating in the steering circuit and waste of engine power. To relieve the excessive back pressure under these conditions a flow divider can be provided to limit the maximum flow to the power steering unit and to spill the excess flow back to the tank. However, the problems of heating in the steering circuit and waste of engine power remain.

One aspect of the present invention is directed to a novel hydraulic system which incorporates a flow divider and two separate pumps. The flow divider combines the respective outputs of both pumps to operate the power steering unit at low pump speeds, so that full steering speed is obtained even when the engine is idling. As the engine speed is increased, the flow divider continues to apply the output of the steering pump to the steering circuit, while the output of the other pump is applied partly to the steering circuit and partly to the circuit of the other load device. At some particular speed the steering pump supplies all of the requirements of the steering circuit. At this and higher speeds the other pump operates at only the pressure in the other circuit, thus reducing heating and power consumption. At even higher speeds the steering pump output exceeds the requirements of the steering system, and the flow divider directs the excess to the circuit of the other load device, along with the entire output of the other pump. The present system also insures that fluid pressure will be directed to the power steering system even if one of the pumps or pump lines fails, thereby avoiding the unsafe condition of a complete pressure failure in the power steering circuit under these circumstances.

It is an object of this invention to provide a novel and improved flow-dividing hydraulic system.

Another object of this invention is to provide such a system which is particularly advantageous for use on a vehicle equipped with power steering and having another hydraulically-operated load device.

Another object of this invention is to provide, on a vehicle having power steering and an additional hydraulically-operated load device, a novel two-pump hydraulic system in which a substantially constant flow is supplied to the steering unit by combining the ouptuts of the two pumps for steering at low speeds, and in which faster operation of the other load device is accomplished at high speeds by adding surplus flow from the power steering circuit to the other load circuit.

Another aspect of this invention relates to a novel flow divider for use in such a system.

Therefore, it is an additional object of this invention to provide a novel and improved flow divider for use in a system having two pressure fluid sources, such as pumps, and two pressure fluid-operated load devices.

A further object of this invention is to provide such a flow divider which automatically controls the respective flows of fluid to the load devices in accordance with the pump outputs.

Further objects and advantages of this invention will be apparent from the following detailed description of certain presently-preferred embodiments thereof, which are illustrated in the accompanying drawings.

Figure 1:
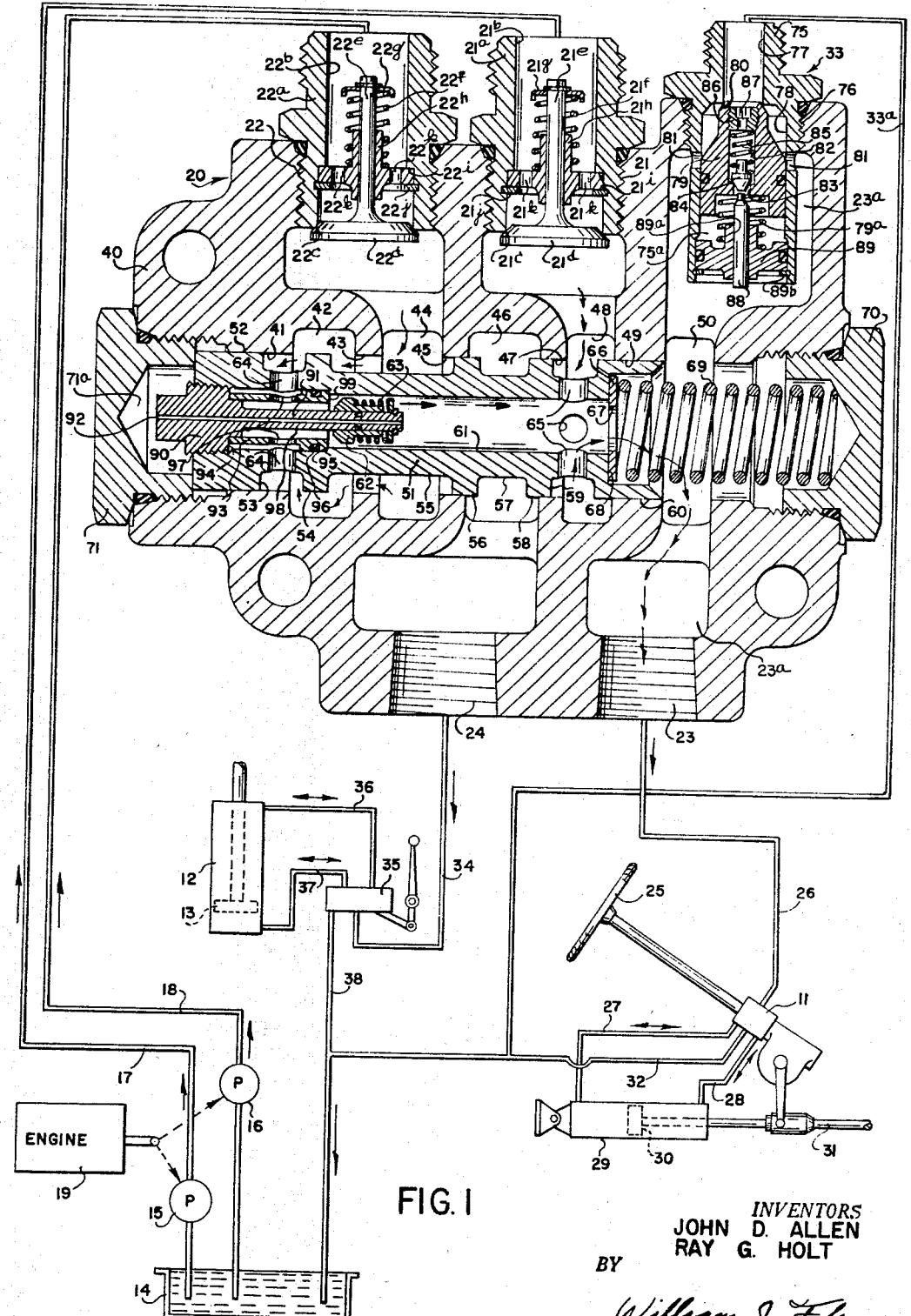
FIGURE 1 is a schematic diagram showing a hydraulic system in accordance with the present invention, with the flow divider shown in longitudinal section in the condition which it assumes during low speed operation of the pumps.

Referring to FIG. 1, the novel system of the present invention includes a first hydraulically-operated load device in the form of a power steering unit for the vehicle including a power steering valve 11. A second hydraulically-operated load device is represented by a cylinder 12 and piston 13, which may be coupled to a bulldozer blade or other power-operated element on the same vehicle as the power steering unit. The system also includes a hydraulic fluid reservoir 14, and two separate pumps 15 and 16 arranged to pump fluid from the reservoir through separate line 17 and 18. The variable speed engine 19 of the vehicle is suitably coupled to both pumps to drive the latter at speeds varying with the engine speed. The system also includes the novel flow divider of the present invention, designated in its entirety by the reference numeral 20 and having two separate inlet ports 21 and 22, connected respectively to the pump output lines 17 and 18, and two outlet ports 23 and 24, connected respectively to the power steering valve 11 and to the cylinder and piston 12, 13.

The power steering valve 11, which may be of any suitable design, is arranged to be operated by the steering wheel 25 of the vehicle to selectively control the flow of hydraulic fluid from a line 26, extending from the flow divider output port 23, to and from lines 27 and 28 connected to opposite ends of a cylinder 29. A piston 30 reciprocable in cylinder 29 is coupled to the steering link 31 of the vehicle. A return line 32 extends from the power steering valve 11 to the reservoir 14.

The fluid circuit for the load device cylinder and piston 12, 13 includes a line 34 extending from the flow divider outlet port 24 to a manually operated valve 35, lines 36 and 37 extending between this valve and opposite ends of the cylinder 12, and a return line 38 leading from valve 35 back to the hydraulic fluid reservoir 14. It will be understood that fluid coming from the flow divider outlet port 24 passes through line 34 and through valve 35 to either the line 36 or the line 37, and the return flow from cylinder 12 through the other of these last-mentioned lines passes through valve 35 to line 38 and thence back to the rserevoir 14.

At the inlet port 21 in the flow divider 20 there is provided a check valve including an annular body 21a, which is threadedly mounted in the inlet port 21. The body 21a has a bore 21b which is connected to the inlet line 17 at its upper end and has an annular valve seat 21c at its lower end. Cooperating with the valve seat 21c is a valve member 21d having an elongated stem 21e extending upward in the bore 21b. A compression spring 21f, acting between a washer 21g on the upper end of the valve stem and a fixed guide member 21h, normally biases the valve member 21d to a position seated against the valve seat 21c. The guide member 21h is secured in place against an internal annular shoulder 21i in the bore by a snap ring 21j. The guide member 21h has a plurality of openings 21k permitting fluid to flow down to the valve member 21d.

Normal fluid pressure in the inlet line 17 will overcome the bias of spring 21f and open the check valve. However, in the event of a failure of the inlet line 17 or pump 15, the check valve will close.

An identical check valve 22a–22k is provided at the other inlet port 22 of the flow divider.

A relief valve 33 is mounted on the flow divider 20, with its inlet communicating with an annular outlet chamber 23a in the flow divider leading to the outlet port 23 and with its outlet connected through a line 33a to the return line 32. This relief valve opens when the pressure of the hydraulic fluid in the flow divider outlet chamber 23a approaches a value which would be excessive for the power steering fluid circuit.

The relief valve 33 comprises a valve body 75 threadedly mounted in an opening 76 in the flow divider housing 20. The valve body 75 has a bore 77, communicating with outlet line 33a, and a counterbore 78 in which a valve member 79 is slidable. At its upper end in FIG. 1 the valve member 79 is adapted to seat against an annular valve seat 80, located at the juncture between the bore 77 and the counterbore 78 in valve body 75. The valve body 75 is formed with a plurality of radial openings 81 providing fluid communication between the flow divider chamber 23a and the counterbore 78 in all positions of valve member 79.

Valve member 79 is formed with a bore 82 leading down to a smaller diameter opening 83. A poppet 84 in bore 82 normally closes this opening. For this purpose a coil spring 85 is engaged under compression between this poppet and a plug 86, threadedly mounted in the upper end of bore 82 and having a central opening 87 which provides fluid communication between the valve body bore 77 and bore 82.

A plunger 88 is slidably mounted in a guide member 89 secured in place in the valve body 75 by means of a snap ring 89b. At its lower end, plunger 88 is exposed to the fluid pressure in chamber 23a in the flow divider.

There is a clearance between plunger 88 and the guide bore 89a in which it is slidable, so that, except when the fluid pressure in chamber 23a changes abruptly, the chamber 75a within valve body 75 between guide member 89 and the lower end of valve member 79 is normally at the same fluid pressure as chamber 23a in the flow divider, due to slow leakage post plunger 88.

A compression spring 79a, engaged between guide member 89 and valve member 79, normally biases valve member 79 upward in FIG. 1 to a position seated against valve seat 80.

In the operation of this relief valve, the chamber 75a below valve member 79 normally is at the same fluid pressure as the flow divider outlet chamber 23a, as is the bore 78. Because of the unequal areas at its lower and upper ends which are exposed to this fluid pressure, there is a net fluid force, aided by spring 79a, acting upwardly on valve member 79 to maintain it closed. This condition prevails as long as poppet 84 remains seated.

When there is an abrupt fluid pressure surge in chamber 23a exceeding a safe value, it moves plunger 88 upward to open the poppet 84, thereby permitting the fluid pressure in chamber 75a to exhaust through the bore 82 and passage 87 to the outlet line 33a. Consequently, the fluid pressure in bore 78 causes valve member 79 to move down away from its seat and to permit the excessive pressure in chamber 23a to exhaust through lines 33a and 32 to the sump 14. As long as the pressure in chamber 23a is above a certain valve it will maintain plunger 88 positioned to hold poppet 84 unseated, so that the relief valve will remain open.

When the fluid pressure in chamber 23a drops below this certain value, plunger 88 will move down away from poppet 84, permitting the latter to reseat under the influence of its spring 85. This, in turn, causes valve member 79 to close again.

The novel flow divider 20 shown in FIG. 1 comprises a cast housing 40 having an axial bore which presents, in succession from left to right in FIG. 1, a cylindrical surface 41, a first annular recess 42, a cylindrical first land 43, a second annular recess 44 in fluid communication with the inlet port 22, a cylindrical second land 45, a third annular recess 46 in fluid communication with the outlet port 24, a cylindrical third land 47, a fourth annular recess 48 in fluid communication with the inlet port 21, a fourth annular land 49, and an annular recess 50 in fluid communication with the outlet chamber 23a and the outlet port 23.

For convenience, the inlet port 21 is referred to hereinafter as the "first inlet port," the port 23 as the "first outlet port," the port 22 as the "second inlet port," and the port 24 as the "second outlet port."

A hollow valve spool 51 is slidable in this bore. This valve spool is formed on its periphery, from left to right in FIG. 1, with a cylindrical end portion 52, a first annular groove 53, a cylindrical first land 54, a relatively long second annular groove 55, a cylindrical second land 56, a third annular groove 57, a cylindrical third land 58, a fourth annular groove 59, and a cylindrical end portion 60. The respective cylindrical end portions and lands on the valve spool have a fluid sealing fit with the aforementioned cylindrical surfaces and lands 41, 43, 45, 47, and 49 on the valve housing.

The valve spool 51 is formed with an internal axial passage 61.

A plug 90 is threadedly mounted in the left end of the valve spool passage 61. Attached integrally to this plug is an elongated stem 91 extending to the right in FIG. 1. The plug and stem are formed with a narrow bleed passage 92 which enables fluid to bleed at a slow rate from the valve spool passage 61 to the left end of plug 90.

A sleeve 93 is engaged between an annular shoulder 94 on the plug and an internal annular shoulder 95 on the valve spool 51. Next to the shoulder 95 the sleeve 93 has a snug fit in the valve spool and carries a resilient deformable O-ring 96 which sealingly engages the valve spool. To the left of this location the sleeve 93 is spaced radially inward from the inside wall of the valve spool 51 and is formed with a plurality of radial openings 97.

The sleeve 93 is spaced radially outward from the stem 91 and forms therewith an annular passage 98 leading to the valve spool passage 61. The aforementioned radial openings 97 lead into passage 98. At its right end in FIG. 1 the sleeve 93 defines an annular valve seat 99 between its passage 98 and the valve spool passage 61.

An annular check valve 62, which is slidably mounted on stem 91, is biased by a spring 63 to seat on this valve seat 99.

This check valve permits fluid under pressure to flow from passage 98 into the valve spool passage 61, but prevents fluid flow in the reverse direction.

A plurality of circumferentially spaced radial openings 64 extend from the first annular groove 53 in the valve spool into its axial passage 61. When the valve spool 51 is in its extreme position to the left in FIG. 1, these openings 64 register with the openings 97 in sleeve 94. A plurality of circumferentially spaced openings 65 lead from the fourth annular groove 59 in the valve spool 51 into its axial passage 61. A flat annular orifice plate 66, having a restricted orifice 67 substantially smaller than the size of passage 61, is held against an internal annular shoulder 68 on the valve spool at the right end of passage 61 by a coil spring 69. The opposite end of spring 69 is engaged by a plug 70 threadedly mounted in the right end of the flow divider housing 40. The opposite end of this bore is similarly closed in fluid-tight fashion by a threaded plug 71, which provides a chamber 71a communicating with the bleed passage 92.

Normally, spring 69 biases the valve spool 51 to the left, to the extreme position shown in FIG. 1, wherein the left end of the valve spool abuts against the inner end of plug 71. In this position of the valve spool, the hydraulic fluid delivered by pump 15 flows through the first inlet port 21, through the fourth annular housing recess 48, fourth valve spool groove 59, valve spool openings 65 and axial passage 61, restriction orifice 67 and housing recess 50 to flow divider outlet port 23 leading to the power steering circuit. The third valve spool land 58, which sealingly engages the third housing land 47 at this time, prevents fluid flow from the first inlet port 21 to the second outlet port 24. At the same time, the hydraulic fluid delivered by pump 16 flows through the second inlet port 22, into the second housing recess 44, along the second valve spool groove 55 into the first housing recess 42, thence into the first valve spool groove 53 through valve spool openings 64, sleeve opening 97, sleeve passage 98, past the check valve 62 into the valve spool passage 61, through the restriction orifice 67 and housing recess 50 to the first outlet port 23. The second valve spool land 56, which sealingly engages the second housing land 45 at this time, prevents fluid flow from the second inlet port 22 to the second outlet port 24. Thus, at this time, substantially the entire outputs of both pumps 15 and 16 are supplied to the power steering unit and there is substantially no fluid being pumped to the other load device 12, 13. This condition prevails as long as the outputs of the pumps are below a predetermined value. As will be readily apparent, the pump outputs vary with the pump speeds, as determined by the speed of engine 19.

When the pump speeds are increased, the respective fluid flows delivered by the pumps and flowing along the axial passage 61 in the valve spool 51 and through the restriction orifice 67 produce an increasing fluid pressure unbalance on opposite sides of the orifice plate 66. This produces a hydraulic force acting on the orifice plate, and hence on the valve spool, in opposition to the force exerted by spring 69. At some particular engine speed the valve spool will begin to move to the right. At progressively higher engine speeds, the valve spool will be displaced farther to the right due to the increased fluid pressure differential force acting on it. An equal and opposing force is exerted on the valve spool by the spring 69, which becomes progressively more compressed as the pump outputs increase. For any particular engine speed, the valve spool 51 will assume a corresponding position axially along the housing bore.

Figure 4:
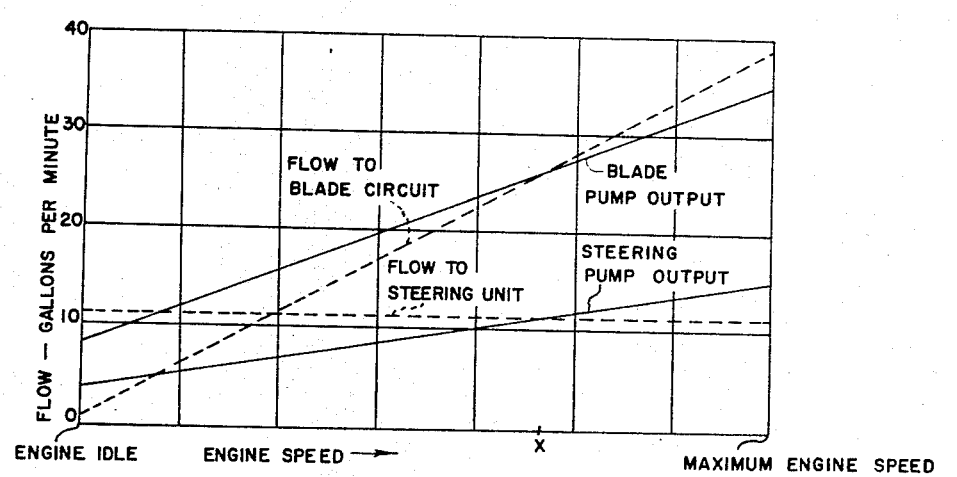
FIGURE 4 is a graphic representation of the respective pump outputs and the respective flows to the load devices at different engine speeds in FIG. 1 system.

FIGURE 4 shows the performance of a particular representative embodiment of this system in which the pump 15 (hereinafter called the "steering pump") delivers substantially 3.5 gallons per minute when the engine 19 is idling and 15 gallons per minute at the maximum engine speed. The other pump 16 (hereinafter called the "blade pump") delivers 8 gallons per minute at engine idle and 35 gallons per minute at the maximum engine speed. Between these limits, the output from each pump varies substantially linearly with the engine speed, as shown in FIG. 4.

Assume that the system is required to provide a substantially constant flow of 11 gallons per minute to the power steering unit at all engine speeds. From FIGURE 4, it will be apparent that this condition is established at engine idle if almost the entire outputs of both pumps are applied to the steering circuit, allowing for a very small flow of only 0.5 gallon per minute to the blade circuit.

In the operation of the FIG. 1 system, the valve spool 51 will be in the position shown in that figure as long as the combined outputs of the two pumps are insufficient to provide the desired 11 gallons per minute flow for the steering unit. This will be the condition when the engine first starts up. Under these circumstances the entire outputs of both pumps are applied to the power steering circuit and there is substantially no output from either pump to the blade circuit.

Figure 2:
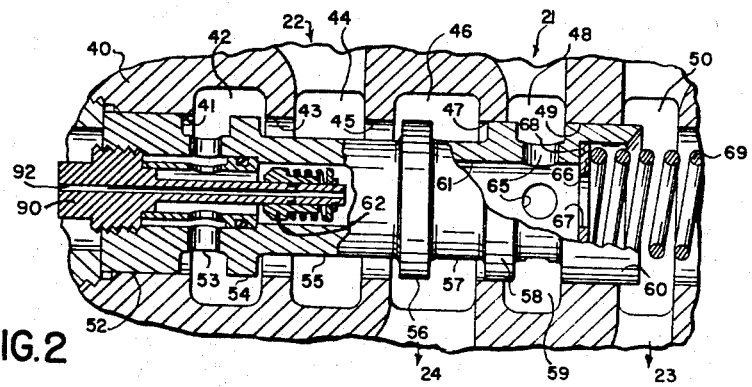
FIGURE 2 is a fragmentary section showing the flow divider in the condition which it assumes at a higher pump speed.

As the pump speeds increase to the point where their combined outputs equal the desired steering flow of 11 gallons per minute, the fluid pressure unbalance across the orifice plate 66 will cause the valve spool 51 to move to the right from the position shown in FIG. 1. At first, referring to FIG. 2, the second valve spool land 56 will move away from the second housing land 45, thereby permitting some of the output of the blade pump 16 to flow from the second inlet port 22 to the second outlet port 24 leading to the blade circuit. Then the first valve spool land 54, moving toward the first housing land 43, will gradually restrict the flow from the blade pump 16 to the steering circuit by way of the sleeve passage 98, check valve 62 and the axial passage 61 in the valve spool. As this action takes place, the flow from the steering pump 15 to the steering circuit continues by way of the first inlet port 21, housing recess 48, valve spool groove 59, valve spool openings 65, valve spool passage 61, restriction orifice 67 and outlet port 23.

The required flow of 11 gallons per minute to the steering circuit is maintained, even though the percentage of the blade pump's output which is being applied to the steering circuit decreases, because the respective flows produced by both pumps (in gallons per minute) increases due to the increasing pump speeds.

Figure 3:
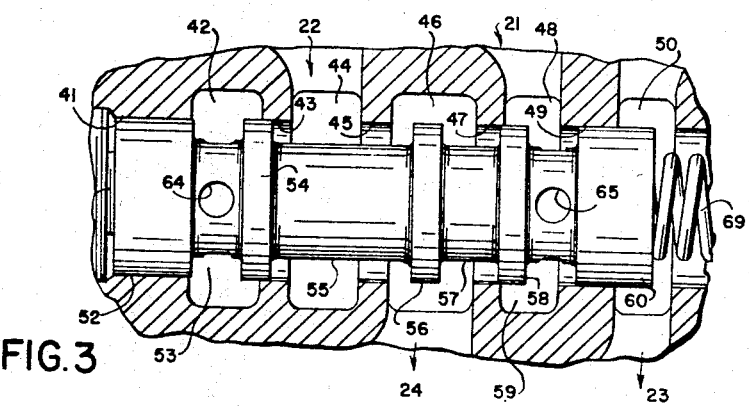
FIGURE 3 is a similar view showing the flow divider in the condition which it assumes at still higher pump speeds.

At some particular engine speed, represented by the point X in FIG. 4, the output of the steering pump 15 will be sufficient to provide all of the required flow of 11 gallons per minute to the steering circuit. At this time, the valve spool 51 will have assumed a position (FIG. 3) in which the first valve spool land 54, engaging the first housing land 43, will completely block the flow of fluid from the blade pump to the steering circuit. At this time all of the blade pump's output will be applied to the blade circuit by virtue of its flow via the second inlet port 22, past the second housing land 45 to the outlet port 24 leading to the blade circuit. At this time, the third valve spool land 58 still seals against the third housing land 47, so that there is no flow from the first inlet port 21 to the second outlet port 24. Check valve 62 is closed at this time.

Upon continued increase in the engine speed, the output of the steering pump 15 will exceed the requirements of the steering circuit. The spool valve 51 then will assume a position even farther to the right than the position shown in FIG. 3, so that its third land 58 will have moved completely past the third housing land 47, permitting some of the fluid from the steering pump to flow to the blade circuit, in addition to that provided by the blade pump. That is, the output of the steering pump in excess of 11 gallons per minute at these higher engine speeds is supplied to the blade circuit along with all of the output from the blade pump.

In case there is a pressure failure in the circuit 34–37 of the load device while there is pressure in the power steering circuit, check valve 62 will prevent the fluid flow intended for the power steering circuit from flowing to the lower pressure load circuit.

In the event of a failure of pump 16 or line 18, the check valve 22a–22k will close automatically. Likewise, if there is a failure of pump 15 or line 17, the check valve 21a–21k will close automatically. This prevents the loss of flow from the pump which has not failed back to the pump or line which has failed.

It will be noted that, in the event either of the pumps 15 or 16 fails, fluid pressure will be maintained to the power steering circuit. This is an important safety factor, particularly on larger vehicles which cannot be steered manually. In prior systems, failure of the steering pump has sometimes resulted in serious injury or death to the operator of such a vehicle.

Figures 5, 6:
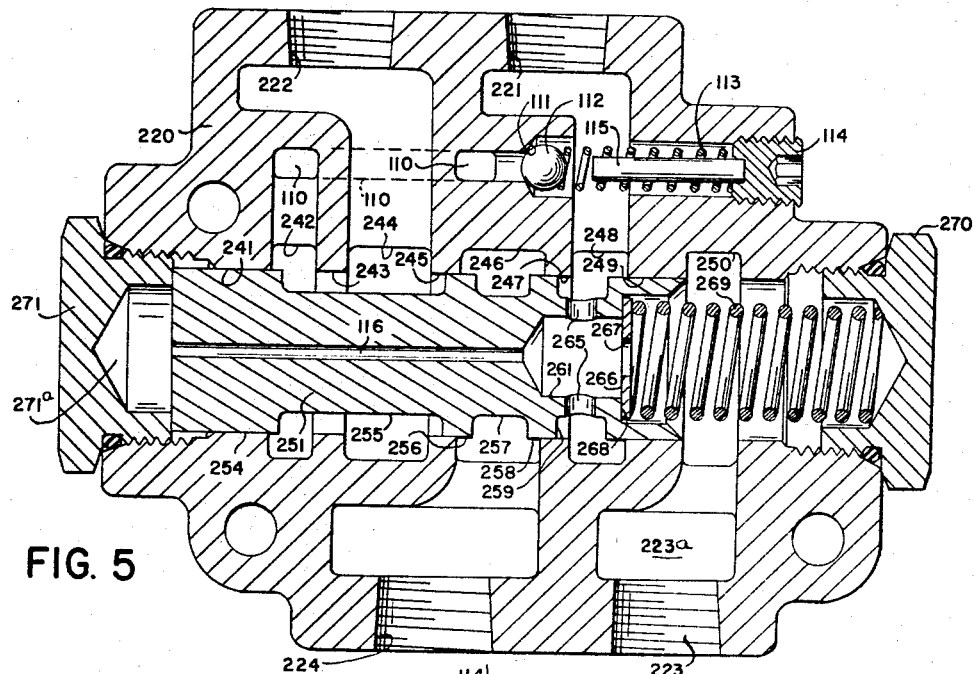
FIGURE 5 is a sectional view showing a different embodiment of the present flow divider, with certain parts omitted for simplicity.
FIGURE 6 is a similar view of a still further embodiment of the present flow divider.

FIGURE 5 shows a simplified version of an alternative embodiment of the present flow divider valve for use in the system of FIG. 1. In FIG. 5, corresponding elements of the flow divider valve are given the same reference numerals as in FIG. 1 plus 200. For the sake of simplicity the check valves at the two inlet ports of the flow divider and the relief valve for the power steering circuit are omitted in FIG. 5. However, it is to be understood that they will be provided, preferably.

Referring to FIG. 5, the first annular recess 242 in the housing is connected by a passage 110 to a valve seat 111. A ball valve 112 normally seats on this valve seat, a bias spring 113 being engaged under compression between the ball valve and a plug 114 threadedly mounted on the housing. A pin 115 carried by this plug limits the extent to which the ball valve 112 can be retracted against its spring.

Fluid under pressure at the housing recess 242 can flow through passage 110 and unseat the ball valve 112 and flow to the annular housing recess 248. Valve 112 acts as a check valve preventing flow in the reverse direction through passage 110. In the operation of the system with which the flow divider is associated, check valve 112 performs the same function as check valve 62 in FIG. 1.

The valve spool 251 has just three annular grooves 255, 257 and 259 in its periphery. It does not have a groove corresponding to the groove 53 in the embodiment of FIG. 1. The first land 254 on the valve spool performs the functions of the first and second valve spool lands 52 and 54 in FIG. 1.

The large diameter passage 261 in the valve spool 251 terminates a short distance to the left of the radial openings 265 in the valve spool. A small diameter balancing and damping passage 116 extends from passage 261 to the chamber 271a at the left end of the valve spool.

The valve spool 251 does not have additional radial openings, corresponding to the openings 64 in FIG. 1, nor does it carry a check valve corresponding to the check valve 62 in FIG. 1.

In other respects the flow divider valve is essentially similar in construction to the valve of FIG. 1.

In the operation of the FIG. 5 valve, the spring 269 normally biases the valve spool 251 to the position shown in FIG. 1. In this position of the valve spool, hydraulic fluid entering the inlet port 222 flows via the housing recess 244, valve spool groove 255 and housing recess 242 to the passage 110, past the check valve 112 to the housing recess 248. The valve spool land 256 sealingly engages the housing land 245 and substantially prevents any of this fluid from flowing to the outlet port 224. At the same time, the hydraulic fluid delivered by the other pump flows through inlet port 221 directly to the housing recess 248. The combined flows pass through the radial openings 265 into the valve spool passage 261 and thence through the restriction orifice 267 to the outlet passage 223 leading to the power steering circuit. Thus, at this time, both pumps deliver fluid to the power steering circuit and substantially no fluid is delivered to the other load circuit connected to outlet port 224.

As the pump speeds increase, the respective fluid flows delivered to the restriction orifice 267 produce an increasing fluid pressure unbalance on opposite sides of the orifice plate 266. At some particular engine speed, the valve spool 251 will move to the right as a result of the unbalanced fluid forces on opposite sides of the orifice plate 266.

The remaining stages of the operation of this flow divider valve are essentially the same as described with reference to the embodiment of FIG. 1.

FIGURE 6 shows a still further embodiment of the present flow divider valve for use in the system of FIG. 1. Corresponding elements in FIG. 6 are given the same reference numerals as in FIG. 1 plus 300. For simplicity the check valves at the two inlet ports and the relief valve for the power steering circuit are omitted from FIG. 6, it being understood that they would be provided on the flow divider valve, preferably.

In FIG. 6, a passage 110′ and a check valve 112′ are provided for the same purpose as the correspondingly numbered elements in FIG. 5.

The lands and grooves on the periphery of the valve spool 351 in FIG. 6 are the same as on the valve spool in FIG. 5. This is also true of the annular recesses and lands on the valve housing with which the valve spool cooperates.

The valve spool has a small diameter balancing and damping passage 116′ which communicates at its right end with a radial passage 120 that opens into the peripheral groove 359 on the valve spool.

In place of the fixed orifice plate carried by the valve spool, the arrangement of FIG. 6 includes a variable orifice member 121, which may be a cylindrical spool rotatably mounted in the housing 320 and presenting a radial passage 122. As shown in FIG. 6, this variable orifice member is located in a passage 123 in the housing connecting the chamber 124 (between inlet port 322 and housing recess 348) and the outlet chamber 323a.

Depending upon the angular position to which it is turned, the variable orifice member 121 provides a fluid pressure differential acting on the valve spool 351 to cause the latter to move to the right when the flow rate through the orifice passage 122 is high enough.

The operation of the FIG. 6 flow divider is essentially similar to that of FIG. 5 and is considered unnecessary to describe in detail.

From the foregoing description it will be apparent that the particular illustrated embodiments of this invention avoid the disadvantages of previous arrangements for the same purpose and are well adapted for the accomplishment of the stated objectives of this invention. However, while certain presently-preferred embodiments have been described in detail and illustrated in the accompanying drawings, it is to be understood that various modifications, omissions and refinements which depart from the disclosed embodiments may be adopted without departing from the spirit and scope of this invention.

What is claimed is:

1. In a hydraulic system, the combination of first and second pumps, variable speed drive means for said pumps, first and second fluid pressure-operated load devices, said first pump when driven at low speed having an output fluid flow which is insufficient for the operation of said first load device, and valve means connected between both said pumps and both said load devices and operative:
- (a) at low pump speeds to connect both pumps to said first load device; and
- (b) at progressively higher pump speeds to progressively restrict the fluid flow from said second pump to said first load device and provide increasing fluid flow from said second pump to said second load device.

2. In a hydraulic system, the combination of first and second pumps, variable speed drive means for said pumps, first and second fluid pressure-operated load devices, said first pump when driven at low speed having an output fluid flow which is insufficient for the operation of said first load device, and valve means connected between both said pumps and both said load devices and operative:
- (a) at low pump speeds to connect both pumps to said first load device; and
- (b) at progressively higher pump speeds to progressively restrict the fluid flow from said second pump to said first load device and provide increasing fluid flow from said second pump to said second load device; and
- (c) at even higher pump speeds, when said first pump delivers fluid in excess of that required to operate said first load device, to pass the excess flow from the first pump to said second load device along with the flow from said second pump for faster operation of said second load device.

3. In a hydraulic system having two different hydraulically-operated loads, the combination of two separate variable speed pumps, a flow divider having a first inlet connected to the outlet of one of said pumps and a second inlet connected to the outlet of the other of said pumps, said flow divider having a first outlet connected to the inlet of one of said loads and a second outlet connected to the inlet of the other of said loads, valve means in said flow divider shiftable to selectively control the flow from each of said flow divider inlets to said flow divider outlets, and means operatively associated with said valve means to control the latter's position and responsive to the fluid flows from said pumps to position said valve means:
- (a) at low pump speeds to pass fluid from both said flow divider inlets to said first flow divider outlet;
- (b) at higher pump speeds to restrict the fluid flow from said second flow divider inlet to said first flow divider outlet and provide partial fluid flow from said second flow divider inlet to said second flow divider outlet while maintaining fluid flow from said first flow divider inlet to said first flow divider outlet; and
- (c) at even higher pump speeds to cut off the fluid flow from said second flow divider inlet to said first flow divider outlet and provide full fluid flow from said second flow divider inlet to said second flow divider outlet while maintaining substantially constant fluid flow from said first flow divider inlet to said first flow divider outlet.

4. In a hydraulic system, the combination of two separate pumps, variable speed drive means for said pumps, two separate fluid pressure-operated load devices, and a flow divider comprising a housing having a bore therein, separate first and second inlet ports connected respectively to the outlets of said pumps and communicating with said bore at two different axial locations therealong, separate first and second outlet ports communicating with said bore at two additional different axial locations therealong and connected respectively to said load devices, said housing having at said bore a plurality of axially spaced lands and recesses between said lands, a valve spool slidable in said bore, said valve spool having a plurality of axially spaced lands on its periphery which have a sealing fit with said lands on the housing and peripheral grooves between said valve spool lands, means biasing said valve spool to a predetermined position axially along said bore in which both said inlet ports communicate with said first outlet port and both said inlet ports are blocked from said second outlet port, and means communicating with both pump outputs defining a restriction orifice communicating with said valve spool to produce a pressure unbalance on said valve spool in response to the flow of fluid through the orifice to shift the valve spool axially from said predetermined position to establish fluid communication between said second inlet port and second outlet port while maintaining fluid communication between said first inlet port and said first outlet port.

5. In a hydraulic system, the combination of first and second pumps, variable speed drive means for said pumps, first and second fluid-operated load devices, and a flow divider comprising a housing having a bore therein, separate first and second inlet ports connected respectively to the outlets of said pumps and communicating with said bore at two different axial locations therealong, separate first and second outlet ports communicating with said bore at two additional different axial locations therealong and connected respectively to said load devices, said housing having at said bore a plurality of axially spaced lands and recesses between said lands, a valve spool slidable in said bore, said valve spool having a plurality of axially spaced lands on its periphery which have a sealing fit with said lands on the housing and peripheral grooves between said valve spool lands, means defining a flow restriction orifice arranged to receive fluid from both pumps and communicating with said valve spool to produce a fluid pressure unbalance on the latter in response to fluid flows from the pumps for shifting the valve spool axially, and means biasing said valve spool to a predetermined position along said bore in which both said first inlet port and said second outlet port communicate with said first outlet port and said second outlet port is blocked from both said inlet ports, whereby to establish fluid flows from both pumps to said first load device, said valve spool being movable axially, under the pressure unbalance produced by fluid flow through said restriction orifice, to establish fluid communication between said second inlet port and said second outlet port and to restrict the fluid flow from said second inlet port to said first outlet port while maintaining the fluid flow from said first inlet port to said first outlet port.

6. In combination with a vehicle having an engine, a hydraulic power steering unit and a hydraulically-operated load device, a steering pump and a load pump driven by the engine, flow divider means connected between both said pumps and the steering unit and the load device and operative to connect both pumps to the steering unit at low engine speeds and to restrict the fluid flow from the load pump to the steering unit at higher engine speeds, and means operative to maintain the flow of fluid to the power steering unit in the event of failure of either of said pumps.

7. In combination with a vehicle having an engine, a hydraulic power steering unit and a hydraulically-operated load device, a steering pump and a load pump driven by the engine, a flow divider having a first inlet connected to the steering pump outlet and a second inlet connected to the load pump outlet, said flow divider having a first outlet connected to said power steering unit and a second outlet connected to said load device, and valve means in said flow divider constructed and arranged to:
- (a) pass fluid from both the steering pump and the load pump to the steering unit at low engine speeds;
- (b) restrict the fluid flow from the load pump to the steering unit while maintaining the fluid flow from the steering pump to the steering unit and providing partial fluid flow from the load pump to the load device at higher engine speeds; and (c) cut off the fluid flow from the load pump to the steering unit and provide full flow from the load pump to the load device while maintaining fluid flow from the steering pump to the steering unit at even higher engine speeds.

8. In combination with a vehicle having an engine, a hydraulic power steering unit and a hydraulically-operated load device, a steering pump and a load pump driven by the engine, said steering pump having an output flow which is insufficient for the operation of said steering unit at low engine speeds, and a flow divider comprising a housing having a bore therein, said housing presenting at said bore a plurality of annular recesses spaced apart lengthwise of the bore and a plurality of cylindrical lands between successive recesses, a valve spool slidable in said bore, said valve spool having on its periphery a plurality of annular grooves spaced apart lengthwise of the valve spool and a plurality of cylindrical lands between successive grooves, said valve spool lands having a sealing fit with said housing lands, said housing having a first inlet port connected to the output of said steering pump and a second inlet port connected to the output of said load pump, a first outlet port connected to said power steering unit and a second outlet port communicating with one of said recesses and connected to said load device, means defining a flow restriction communicating at one side with said pumps and at the opposite side with said first outlet port, said flow restriction communicating with said valve spool to produce a fluid pressure unbalance on the latter in response to the flow of fluid through the flow restriction, and spring means biasing said valve spool axially to a position in which fluid flows from both pumps through both said first and second inlet ports through said flow restriction to said first outlet port and thence to said steering pump and fluid flow from either inlet port to said second outlet port is blocked, said valve spool being movable axially against said spring, due to the pressure drop across said orifice upon increasing fluid flow therethrough, to restrict the flow of fluid from said second inlet port to said first outlet port and to establish a fluid flow path between said second inlet port and said second outlet port while maintaining the fluid flow from said first inlet port to said first outlet port, whereby to restrict the fluid flow from said load pump to said steering unit and to establish fluid flow from said load pump to said load device while maintaining the fluid flow from said steering pump to said steering unit, said valve spool being movable further axially against said spring, upon further increased fluid flow through said flow restriction, to maintain fluid flow between said second inlet port and said second outlet port and to establish partial fluid flow between said first inlet port and said second outlet port while maintaining fluid flow between said first inlet port and said first outlet port, whereby to divert surplus flow from the steering pump to said load device while maintaining fluid flow from the load pump to said load device and from the steering pump to the steering unit.

9. A flow divider comprising a housing having a bore therein, first and second inlet ports communicating with said bore at axially spaced locations therealong, said housing having at said bore between said inlet ports a pair of axially spaced lands and a recess between said lands, a first outlet port communicating with said bore, a second outlet port communicating with said recess between said lands, a valve spool slidable along said bore, said valve spool having a pair of axially spaced lands on its periphery spaced apart from each other a shorter distance than the spacing between said pair of housing lands, yieldable means biasing said valve spool to a first position axially along said bore in which said pair of valve spool lands sealingly engage respectively said pair of housing lands and said valve spool blocks both said inlet ports from said second outlet port, means providing fluid communication between both said inlet ports and said first outlet port in said first position of the valve spool and including fluid pressure differential means operatively associated with said valve spool to cause the latter to move axially along the bore in a direction away from said second inlet port, in response to increasing flow through the inlet ports, to progressively disengage the respective valve spool land from the housing land disposed between the second inlet port and said recess to thereby connect the second inlet port to the second outlet port while initially maintaining the other of said valve spool lands sealingly engaging the housing land disposed between said recess and the first inlet port to thereby maintain said first inlet port blocked from said second outlet port.

10. The flow divider of claim 9, wherein said valve spool, upon continued movement in said direction away from the second inlet port, disengages said other valve spool land from the said last-mentioned housing land to connect said first inlet port to said second outlet port, while maintaining said second inlet port connected to said second outlet port.

11. In a hydraulic system, the combination of two separate pumps, variable speed drive means for said pumps, two separate fluid pressure-operated load devices, a flow divider having a first inlet connected to the outlet of one of said pumps and a second inlet connected to the outlet of the other of said pumps, said flow divider having a first outlet connected to the inlet of one of said load devices and a second outlet connected to the inlet of the other of said load devices, and valve means in said flow divider shiftable to selectively control the flow from each of said inlets to said outlets in accordance with the pump speed, said valve means being operative:

(a) at low pump speeds to pass fluid from both said inlets to said first outlet;

(b) at higher pump speeds to restrict the fluid flow from said second inlet to said first outlet and provide partial fluid flow from said second inlet to said second outlet while maintaining fluid flow from said first inlet to said first outlet; and (c) at even higher pump speeds to cut off the flow of fluid from said second inlet to said first outlet and provide full fluid flow from said second inlet to said second outlet while maintaining fluid flow from said first inlet to said first outlet.

References Cited by the Examiner

UNITED STATES PATENTS

| | | | |
|---|---|---|---|
| 2,103,530 | 12/1937 | Henry | 60—52 X |
| 2,487,618 | 11/1949 | Twyman. | |
| 2,643,516 | 6/1953 | Carlson | 60—52 |
| 2,649,115 | 8/1953 | Deardorff | 137—108 |
| 2,799,996 | 7/1957 | Van Meter. | |
| 2,859,762 | 11/1958 | Banker | 137—108 X |
| 2,905,191 | 9/1959 | Vander Kaay | 137—108 |
| 2,971,524 | 2/1961 | Ruhl | 137—108 |
| 3,024,798 | 3/1962 | Banker | 137—101 |
| 3,033,277 | 5/1962 | Cowles et al | 137—117 |
| 3,083,533 | 4/1963 | Schenkelberger | 180—79.2 X |

KENNETH H. BETTS, *Primary Examiner.*

PHILIP ARNOLD, *Examiner.*

R. M. WOHLFARTH, *Assistant Examiner.*